United States Patent
Warren et al.

(10) Patent No.: US 11,513,491 B2
(45) Date of Patent: Nov. 29, 2022

(54) PROCESS CONTROL FOR PRODUCTION OF LIQUID FOOD

(71) Applicant: Tetra Laval Holdings & Finance S.A., Pully (CH)

(72) Inventors: Carey Warren, Kenosha, WI (US); Nicolas Langlois, Mundelein, IL (US)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 140 days.

(21) Appl. No.: 16/617,470

(22) PCT Filed: May 24, 2018

(86) PCT No.: PCT/EP2018/063677
§ 371 (c)(1),
(2) Date: Nov. 26, 2019

(87) PCT Pub. No.: WO2018/219782
PCT Pub. Date: Dec. 6, 2018

(65) Prior Publication Data
US 2020/0183351 A1    Jun. 11, 2020

(30) Foreign Application Priority Data

May 29, 2017    (EP) .................................... 17173178

(51) Int. Cl.
  *G05B 19/05*    (2006.01)
  *A23L 5/00*    (2016.01)
  *G05B 19/418*    (2006.01)
(52) U.S. Cl.
  CPC .............. *G05B 19/056* (2013.01); *A23L 5/00* (2016.08); *G05B 19/41865* (2013.01);
  (Continued)

(58) Field of Classification Search
  CPC ............ G05B 19/056; G05B 19/41865; G05B 2219/13108; G05B 2219/32077; A23L 5/00; A23V 2002/00; Y02P 90/02
  See application file for complete search history.

(56) References Cited

U.S. PATENT DOCUMENTS 5,539,288 A * 7/1996 Neijzen .................. A47J 43/04
                                                    318/432
5,832,814 A * 11/1998 Nakatani ................. A21C 9/08
                                                    99/450.6
(Continued)

FOREIGN PATENT DOCUMENTS

| EP | 2 169 493 A1 | 3/2010 |
| EP | 2 395 406 A2 | 12/2011 |
| WO | WO 2013/092414 A1 | 6/2013 |

OTHER PUBLICATIONS

International Search Report and Written Opinion for International Application No. PCT/EP2018/063677, dated Aug. 3, 2018 in 9 pages.

(Continued)

*Primary Examiner* — Chad G Erdman
(74) *Attorney, Agent, or Firm* — Knobbe, Martens, Olson & Bear, LLP

(57) ABSTRACT

A system for production of liquid food (P) comprises a food processing arrangement (2) and a computer device (3), e.g. a PLC. The computer device (3) sequentially executes a control program (5A) to control the food processing arrangement (2) to perform processing steps for producing the liquid food (P) from one or more ingredients in accordance with a predefined recipe. The program comprises command instructions that each allocates a respective processing step to a predefined control command among a predefined set. To enable parallelism, despite the sequential execution by the computer device (3), the set of control commands comprises (Continued)

a start command which is associated, by the computer device (3), with an action of: starting the food processing step that is allocated to the start command and proceeding, without waiting for the food processing step to be completed, to a subsequent instruction in the list of instructions.

11 Claims, 4 Drawing Sheets

(52) U.S. Cl.
CPC .............................. *A23V 2002/00* (2013.01); *G05B 2219/13108* (2013.01); *G05B 2219/32077* (2013.01)

(56) References Cited

U.S. PATENT DOCUMENTS

| | | | |
|---|---|---|---|
| 8,150,541 B2* | 4/2012 | Moore, Jr. ....... | G05B 19/41865 700/103 |
| 2011/0301734 A1* | 12/2011 | Krehbiel .............. | G05B 19/418 700/99 |
| 2017/0348854 A1* | 12/2017 | Oleynik ................. | A47J 47/02 |

OTHER PUBLICATIONS

Extended European Search Report issued in European Patent Application No. 17173178.9, dated Nov. 9, 2017; in 9 pages.

* cited by examiner

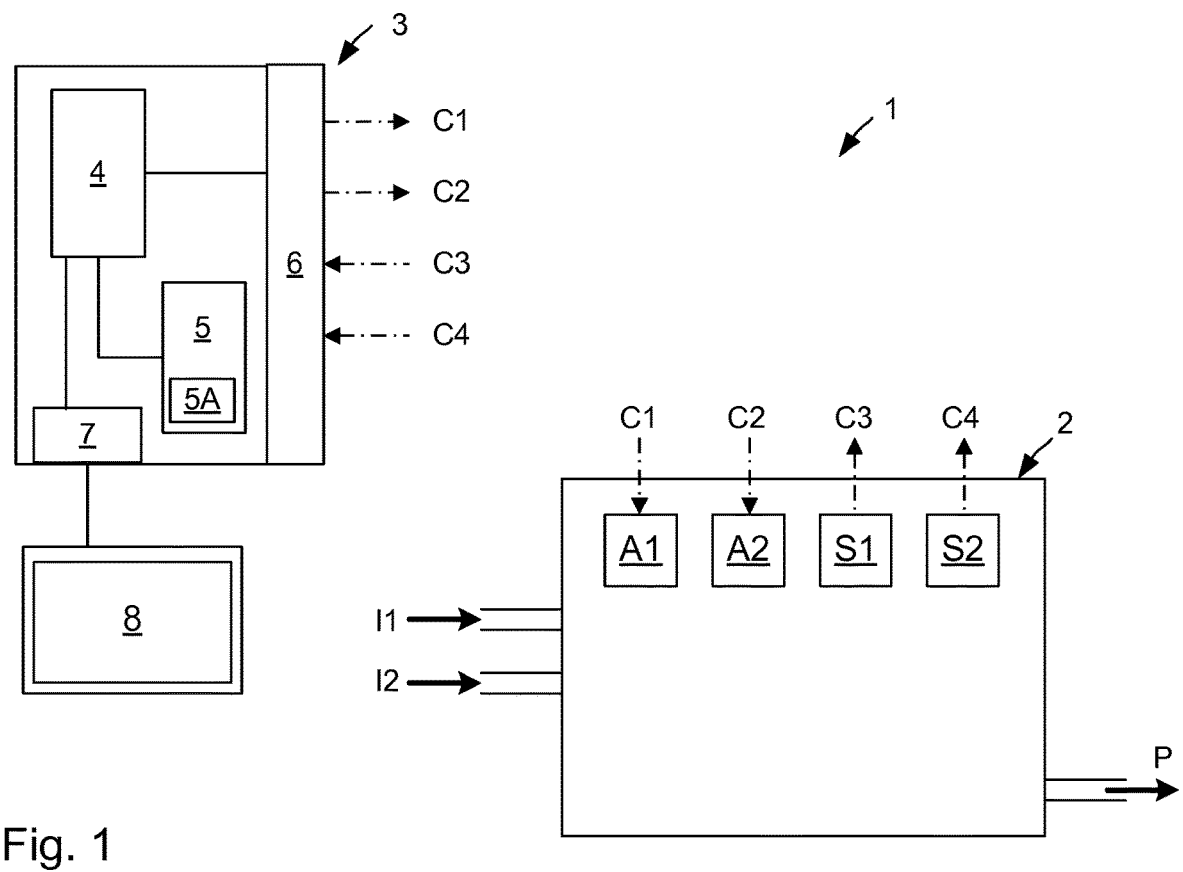
Fig. 1
| NO. | INSTRUCTION |
|---|---|
| 21 | INITIATION |
| 22 | RUN : FOOD PROCESSING STEP A |
| 23 | START : FOOD PROCESSING STEP B |
| 24 | START : FOOD PROCESSING STEP C |
| 25 | RUN : FOOD PROCESSING STEP D |
| 26 | RUN : FOOD PROCESSING STEP E |
| 27 | CHECK : FOOD PROCESSING STEP B |
| 28 | CHECK : FOOD PROCESSING STEP C |
| 29 | CONCLUSION |
Fig. 2A
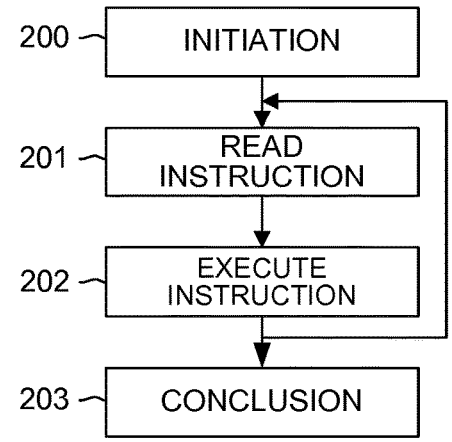
Fig. 2B

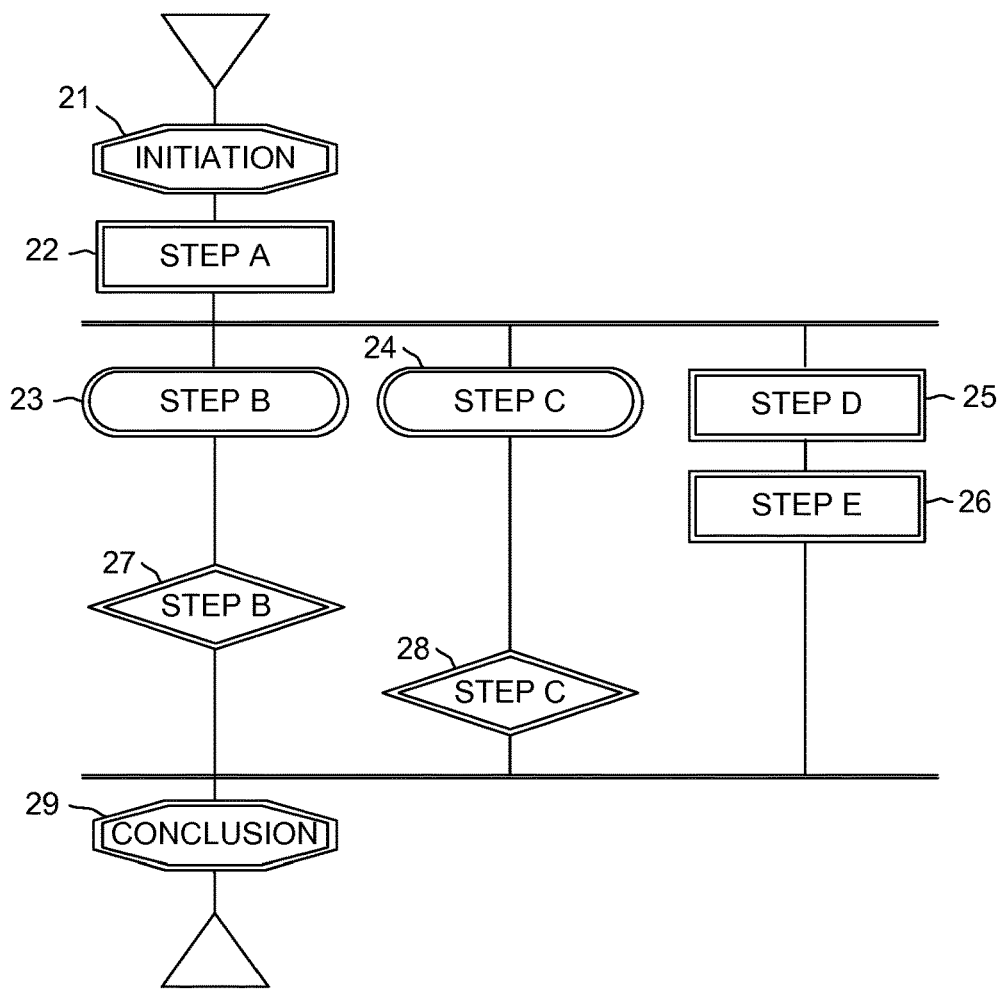
Fig. 2C
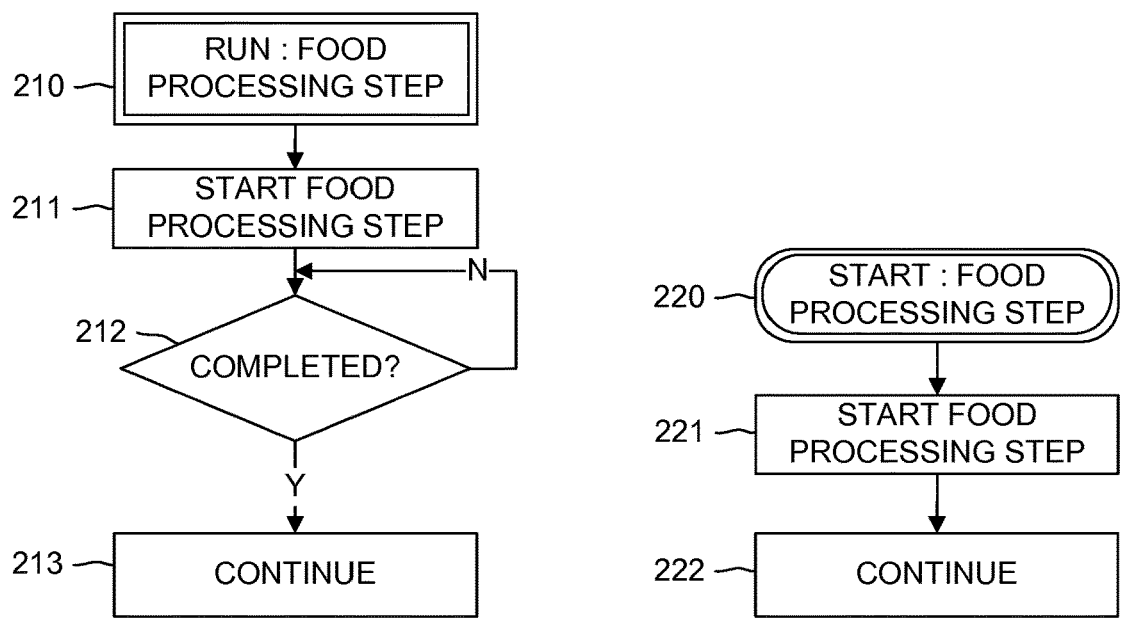
Fig. 2D
Fig. 2E

| NO. | INSTRUCTION |
|---|---|
| 401 | INITIATION - TANK |
| 402 | INITIATION - LINE |
| 403 | INITIATION - MIXER |
| 404 | START : LINE - TRANSFER MILK |
| 405 | START : TANK - HEAT TO TEMPERATURE |
| 406 | START : MIXER - CIRCULATE |
| 407 | RUN : MIXER - ADD COCOA |
| 408 | RUN : MIXER - ADD SUGAR |
| 409 | CHECK : LINE - TRANSFER MILK |
| 410 | CHECK: TANK - HEAT TO TEMPERATURE |
| 411 | RUN : TANK -TIMER 30 MIN |
| 412 | RUN : TANK - COOL TO TEMPERATURE |
| 413 | END : MIXER - CIRCULATE |
| 414 | RUN : TANK - QUALITY CHECK |
| 415 | CONCLUSION - MIXER |
| 416 | CONCLUSION - LINE |
| 417 | CONCLUSION - TANK |

Fig. 4A

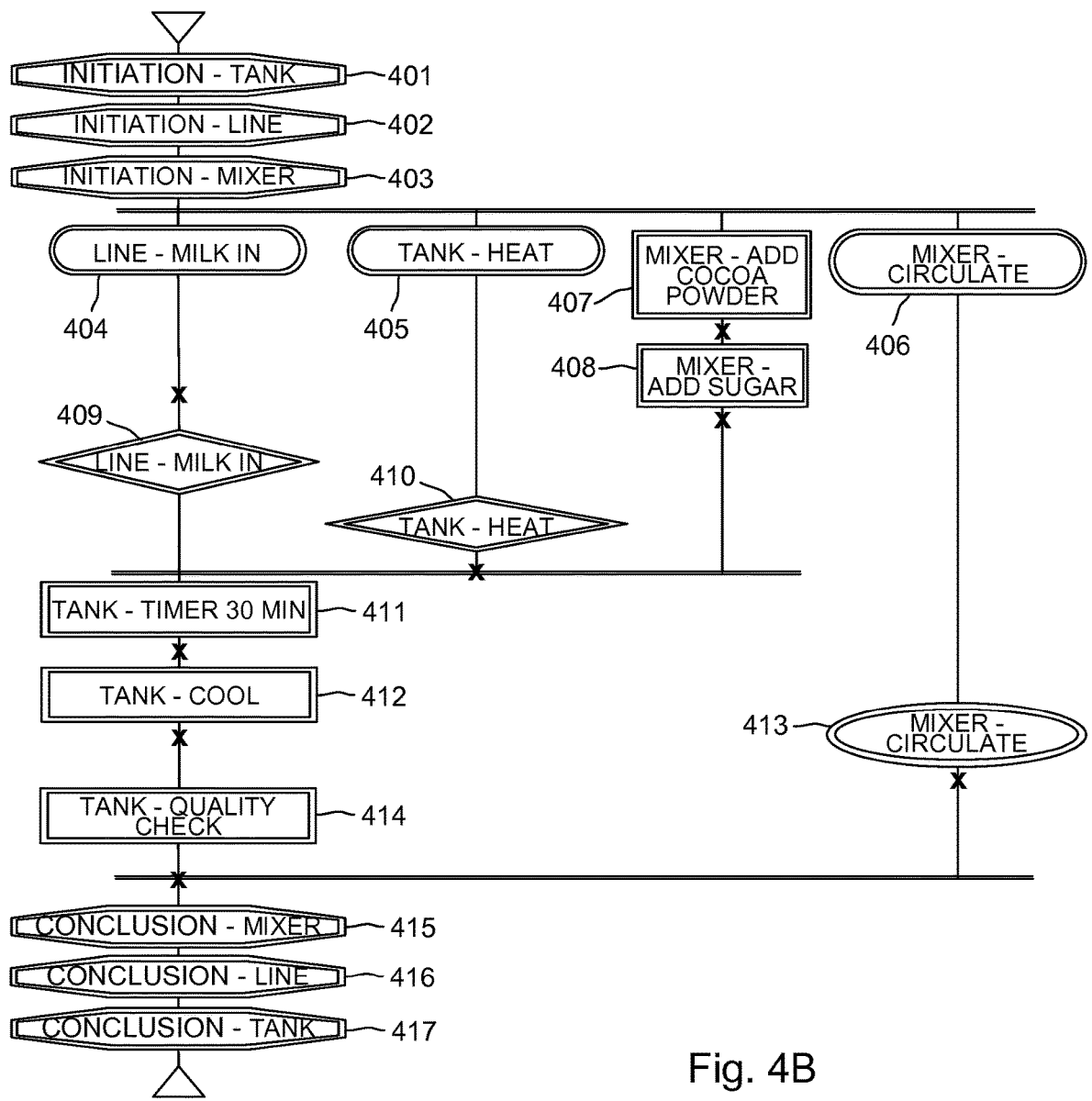

Fig. 4B

PROCESS CONTROL FOR PRODUCTION OF LIQUID FOOD

TECHNICAL FIELD

The invention generally relates to process control for production of liquid food, and in particular to a technique of controlling a food processing arrangement by a computer device to perform a number of food processing steps to produce the liquid food from one or more ingredients.

BACKGROUND

Liquid food is any food product that is non-solid at room temperature, including beverages, such as fruit juices, wines, beers, sodas, as well as dairy products, sauces, oils, creams, custards, soups, etc.

Liquid food is produced in accordance with a predefined recipe, which defines the ingredients to be used, their relative quantities, and a number of food processing steps that shall be performed on the ingredients in order to turn them into the liquid food. The recipe may also define a duration of one or more of the processing steps, and as well as a required ordering of one or more of the food processing steps. Depending on food product, the food processing steps that involve one or more of adding ingredients, mincing, slicing, grinding, mixing, blending, heating, cooling, steaming, centrifuging, carbonating, as well as performing maceration, liquefaction, emulsification, etc.

Industrial production of liquid food is automated and involves advanced process control of a food processing arrangement to perform the food processing steps in accordance with the recipe. The aim of the process control is generally to produce the liquid food at high throughput and consistent quality with minimum use of resources. The process control is carried out by a control device that operates the food processing arrangement in accordance with a predefined control program that implements the recipe.

In process control in general, it is common that the control device is a so-called PLC, Programmable Logic Controller, which is an industrial digital computer which has been ruggedised and adapted for the control of processes that require high reliability control and ease of programming and process fault diagnosis. One limitation of a PLC is that it is only capable of single-threaded processing. This means that the PLC is a sequentially operating computer device that is only capable of processing one instruction at a time of the control program. Thus, in production of liquid food, a PLC is only capable of executing the food processing steps in sequential manner. This may cause the execution of a recipe to take an undesirably long time, and may even preclude the use of a PLC for production of liquid food when the recipe mandates certain food processing steps to be executed in parallel. It is therefore common in production of liquid food that the control device is a computer device with an operating system that supports multithreading, e.g. a PC (Personal Computer). However, while a PC is capable of executing food processing steps in parallel, it is less suited for high-reliability and robust control in an industrial environment.

SUMMARY

It is an object of the invention to at least partly overcome one or more limitations of the prior art. In particular, it is an object to provide a technique that enables high-reliability control of a production process for liquid food in which food processing steps are executed in parallel.

Yet another object is to provide a technique that enables a single-threaded computer device to control a food processing arrangement to perform food processing steps in parallel for production of liquid food.

One or more of these objects, as well as further objects that may appear from the description below, are at least partly achieved by a system for production of liquid food and a method of producing liquid food according to the independent claims, embodiments thereof being defined by the dependent claims.

A first aspect of the invention is a system for production of liquid food. The system comprises: a food processing arrangement operable to perform a number of food processing steps for one or more ingredients to be processed into the liquid food; and a computer device which is connected to the food processing arrangement and configured to control the food processing arrangement to perform the food processing steps. The computer device comprises: a memory unit for storing a control program that comprises a list of instructions for causing the food processing arrangement to perform the food processing steps, wherein the list comprises command instructions that each allocates a respective food processing step to a predefined control command among a set of predefined control commands; and a processor unit configured to sequentially execute the instructions in the list of instructions. The set of predefined control commands comprises a first start command which is associated, by the processor unit, with an action of: starting the food processing step that is allocated to the first start command and proceeding, without waiting for the food processing step to be completed, to a subsequent instruction in the list of instructions.

In some embodiments, the set of predefined control commands further comprises at least one stop command which is associated, by the processor unit, with an action of: ensuring a termination of the food processing step that is allocated to the at least one stop command.

In some embodiments, the at least one stop command comprises a first stop command which is associated, by the processor unit, with an action of: commanding the food processing step that is allocated to the first stop command to terminate, waiting for the food processing step to terminate, and proceeding, when the food processing step has terminated, to the subsequent instruction in the list of instructions.

In some embodiments, the at least one stop command comprises a second stop command which is associated, by the processor unit, with an action of: waiting for the food processing step that is allocated to the second stop command to be completed, and proceeding, when the food processing step is completed, to the subsequent instruction in the list of instructions.

In some embodiments, the set of predefined control commands further comprises a second start command which is associated, by the processor unit, with an action of: starting the food processing step that is allocated to the second start command, waiting for the food processing step to be completed, and proceeding, when the food processing step is completed, to the subsequent instruction in the list of instructions.

In some embodiments, the food processing arrangement comprises a set of processing devices, the computer device comprising a signal interface for communication with the set of processing devices, and the processor unit being configured to, for at least a subset of the command instructions, communicate with one or more processing devices in the set of processing devices.

In some embodiments, the set of processing devices comprises one or more of a valve, a mixing device, a heating device, a cooling device, a temperature sensor, a fluid flow sensor, and a pressure sensor.

In some embodiments, the processor unit is configured for single-threaded processing of the list of instructions.

In some embodiments, the computer device is a Programmable Logic Controller, PLC.

A second aspect of the invention is a method of producing liquid food according to a predefined recipe which defines food processing steps of a food processing arrangement for producing the liquid food from one or more ingredients. The method is performed by a computer device that executes a control program and controls the food processing apparatus in accordance with the predefined recipe. The method comprises, repeatedly: reading a current instruction from a list of instructions in the control program, and executing the current instruction before proceeding to execute a subsequent instruction in the list of instructions, wherein a start instruction in the list of instructions comprises a predefined control command that causes the computer device to control the food processing arrangement to start a first food processing step and to proceed, without waiting for the first food processing step to be completed, to execute the instruction that comes after the start instruction in the list of instructions.

In some embodiments, a stop instruction in the list of instructions comprises a predefined control command that causes the computer device to ensure that the food processing arrangement completes the first food processing step.

In some embodiments, a stop instruction in the list of instructions comprises a predefined control command that causes the computer device to command the first food processing step to terminate, wait for the first food processing step to terminate, and proceed, when the first food processing step is terminated, to the instruction that comes after the stop instruction in the list of instructions.

In some embodiments, a stop instruction in the list of instructions comprises a predefined control command that causes the computer device to wait for the first food processing step to be completed, and proceed, when the first food processing step is completed, to the instruction that comes after the stop instruction in the list of instructions.

In some embodiments, a further starting instruction in the list of instructions comprises a predefined control command that causes the computer device to start a second food processing step, wait for the second food processing step to be completed, and proceed, when the second food processing step is completed, to the instruction that comes after the further starting instruction in the list of instructions.

In some embodiments, the computing device executes single-threaded processing of the list of instructions.

Still other objectives, features, aspects and advantages of the invention will appear from the following detailed description as well as from the drawings.

DRAWINGS

Embodiments of the invention will now be described, by way of example, with reference to the accompanying schematic drawings.

FIG. 1 is a block view of a system for production of liquid food.

FIG. 2A shows an instruction list comprising predefined control commands for a computer device in the system of FIG. 1.

FIG. 2B is a flow chart for the sequential execution of the instruction list in FIG. 2A by the computer device.

FIG. 2C is a graphical representation of a recipe implemented by the instruction list in FIG. 2A.

FIGS. 2D-2G illustrate different predefined control commands and the actions associated therewith.

FIG. 4A shows an instruction list corresponding to a recipe for production of cocoa milk in the food processing arrangement of FIG. 3.

FIG. 4B is a graphical representation of the recipe implemented by the instruction list in FIG. 4A.

DETAILED DESCRIPTION

Figure 2F:
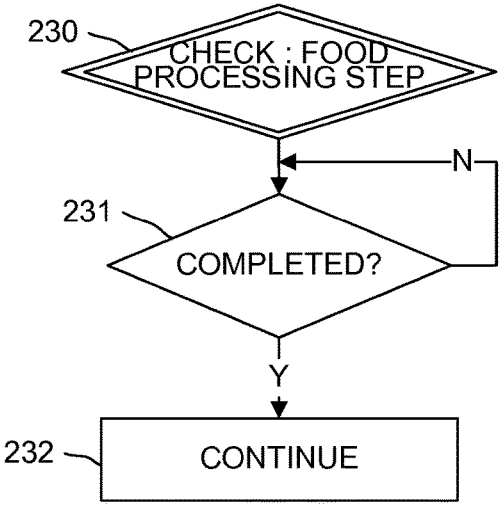

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

FIG. 1 illustrates a system 1 for production of liquid food. As used herein, "liquid food" includes any edible substance that is non-solid at room temperature. Non-limiting examples of liquid food was given in the Background section. The system 1 comprises a food processing arrangement 2 which is configured to receive and process a number of ingredients, here two ingredients 11, 12, into the liquid food P. The food processing arrangement 2 is operable to perform a number of food processing steps on the ingredients 11, 12 to produce the liquid food P. Non-limiting examples of such food processing steps are given in the Background section. The arrangement 2 may be configured to produce the liquid food P in batches ("batch production") or continuously ("line production"), or a combination thereof. The arrangement 2 may include a single apparatus, as in FIG. 1, or a combination of apparatuses. In the illustrated example, the arrangement 2 includes actuators A1, A2 and sensors S1, S2 that are operable to perform one or more of the food processing steps during production of the liquid food P. The actuators A1, A2 and sensors S1, S2 are collectively denoted "processing devices" herein. Such processing devices may, e.g., comprise one or more of a pump, a valve, a mixing device, a heating device, a cooling device, a temperature sensor, a flow sensor and a pressure sensor.

A computer device 3 is connected, by wire or wirelessly, to the food processing arrangement 2. The computer device 3 generates control signals C1, C2 to operate the actuators A1, A2, individually or jointly, to perform the food processing steps in accordance with a predefined recipe. As indicated in FIG. 1, the computer device 3 may also, during one or more of the food processing steps, receive input signals C3, C4 that are representative of one or more process parameters measured by the sensors S1, S2 and control the food processing arrangement 2 in response to the process parameter(s).

The computer device 3 is configured for single-threaded processing. As used herein, "single-threaded processing" is given its conventional meaning and refers to a computer-implemented process that executes a list of tasks in sequential order, one task after the other. In the following examples, the computer device 3 is presumed to be a PLC, which is inherently configured for single-threaded processing. In an alternative, the computer device 3 may instead be a single- or multi-core computer that is capable of multi-thread processing but is specifically operated for single-threaded processing.

In the example of FIG. 1, the PLC 3 comprises a processor 4 ("processor unit"), a digital storage memory 5 ("memory unit"), and a signal interface 6 for input and output (I/O) of the signals C1-C4. The processor 4 is configured to execute a control program 5A which is stored in memory 5. The control program 5A thereby causes the processor 4 to generate the control signals C1, C2 and acquire the input signals C3, C4 via the signal interface 6. The PLC further comprises a driver 7 for an MMI 8 (Man Machine Interface). The MMI 8 may be operated by the processor 6, via the driver 7, to present information or instructions for an operator in relation to the food processing arrangement 2, and to accept input data, control instructions and confirmations from the operator. The MMI 8 may, e.g., comprise one or more of a display, a touch screen, a speaker, a microphone, a mouse, a keyboard, a track pad, buttons, sliders, switches and knobs.

Embodiments of the inventions relate to a clever way of circumventing limitations imposed by the inherently sequential nature of the PLC 7 and thereby enable the PLC 7 to control the food processing arrangement 2 to perform one or more food processing steps in parallel.

FIG. 2A shows an example of a list 20 of instructions included in a control program 5A for the PLC 3 in FIG. 1. The instruction list 20 is designed to operate the food processing arrangement 2 to perform five food processing steps A-E to produce the liquid food P. To facilitate the following discussion, the instructions are numbered consecutively as 21-29. Each instruction 21-29 is associated with a respective task. As explained above, the processor 4 will execute the instructions 21-29 in the list 20 sequentially, such that processor 4 will not proceed from a current instruction to the subsequent instruction in the list 20 until the task associated with the current instruction is completed.

It should be emphasized that all instruction lists presented herein are highly schematic and are merely intended to illustrate principles of operation at a level of detail sufficient for a person skilled in the art of programming to implement these principles into computer code for execution by a suitable computer device.

The processing of the instruction list 20 by the PLC 3 is further illustrated in FIG. 2B. The processing starts by the processor 4 reading and executing instruction 21, which causes the processor 4 to perform a task of initiation 200. The initiation task 200 may involve one or more of configuring the PLC 3 for controlling the food processing arrangement 2, powering and configuring the actuators A1, A2 and/or sensors S1, S2, informing other systems that the PLC 3 assumes control of the food processing arrangement 2, etc. The processor 4 then proceeds to repeatedly read 201 a current instruction from the list 20 and then execute 202 the current instruction until its associated task is completed. Thus, in the example of FIG. 2A, the processor 4 will control the food processing arrangement 2 to perform and complete the task associated with instruction 22, before proceeding to control the food processing arrangement 2 to perform and complete the task associated with instruction 23, and so on. After completing the task associated with instruction 28, the processor 4 reads and executes instruction 29, which causes the processor 4 to perform a task of conclusion 203, which may involve one or more of informing other systems that the PLC 3 releases its control of the food processing arrangement 2, deactivating the actuators A1, A2 and/or sensors S1, S2, etc.

As used herein, instructions 22-28 in FIG. 2A are denoted "command instructions", in that they comprise a predefined control command for the processor 4. In a command instruction, a food processing step is allocated to the control command, as indicated by the notation "control command: food processing step" in the drawings. The processor 4 associates the command with a predefined action to be performed with respect to the allocated food processing step. Thereby, the combination of the control command and the allocated food processing step defines a task to be performed.

In embodiments of the invention, at least four different control commands are predefined for the processor 4, namely "RUN", "START", "CHECK" and "END". The association between control commands and actions may be defined to the processor 4 by a separate data structure stored in memory 5, or may be included in the control program 5A.

The actions associated with these control commands by the processor 4 are illustrated in the flow charts in FIGS. 2D-2G.

The processor action for control command RUN is illustrated in FIG. 2D. As indicated, a command instruction 210 that allocates a food processing step to the command RUN, causes the processor to start 211 the allocated food processing step, e.g. by transmitting one or more control signals C1, C2 to the food processing arrangement 2 or by presenting a command for the operator on the MMI 8 to take specific action. Then, the processor waits 212 until the allocated food processing step is completed. In all embodiments presented herein, the processor may determine that the allocated food processing step is completed based on any suitable completion criterion, e.g. based on a value of one or more process parameters as indicated by signals C3, C4 from the sensors S1, S2 in the food processing arrangement 2, or based on a confirmation of completion entered by an operator via the MMI 8, or when a predefined time period has elapsed after the start 211 of the allocated food processing step. After determining that the food processing step is completed, the processor proceeds 213 to the subsequent (next) instruction in the instruction list 20. Thus, RUN is a start command that results in the task of starting the allocated food processing step and performing the allocated food processing step until completion.

The processor action for control command START is illustrated in FIG. 2E. As indicated, a command instruction 220 that allocates a food processing step to the command START, causes the processor to start 221 the allocated food processing step, by transmitting one or more control signals C1, C2 to the food processing arrangement 2. Then, the processor proceeds 222 to the next instruction in the instruction list 20, i.e. without waiting for the allocated food processing step to be completed. Thus, START is a start command that results in the task of starting the allocated food processing step in an open-ended fashion, i.e. without consideration of its further course.

The processor action for control command CHECK is illustrated in FIG. 2F. As indicated, a command instruction 230 that allocates a food processing step to the command CHECK, causes the processor to check 231 if the allocated food processing step is completed, e.g. based on any of the above-mentioned completion criteria. If not completed, the processor is caused to wait for completion. After determining that the food processing step is completed, the processor proceeds 232 to the next instruction in the instruction list 20. Thus, CHECK is a stop command that results in the task of waiting for completion of the allocated food processing step.

Figure 2G:
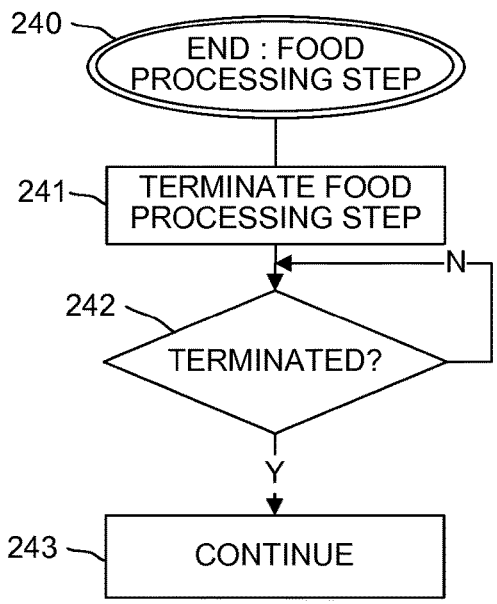

The processor action for control command END is illustrated in FIG. 2G. As indicated, a command instruction 240 that allocates a food processing step to the command END, causes the processor to terminate 241 the food processing step, e.g. by transmitting one or more control signals C1, C2 to the food processing arrangement 2 or by presenting an instruction on the MMI 8 for the operator to take specific action. Then, the processor waits 242 for confirmation that the food processing step has been terminated, e.g. based on any of the above-mentioned completion criteria. After determining that the food processing step has been terminated, the processor proceeds 243 to the next instruction in the instruction list 20. Thus, END is a stop command that results in the task of forcing the allocated food processing step to be terminated without consideration of its current status.

In the following, the command instructions that allocate a food processing step to the respective control command RUN, START, CHECK and END are denoted RUN instruction, START instruction, CHECK instruction and END instruction, respectively.

Reverting to the instruction list 20 in FIG. 2A, it is seen that its command instructions 22-28 include the commands RUN (instructions 22, 25 and 26), START (instructions 23, 24) and CHECK (instructions 27, 28). FIG. 2C indicates the relative timing of the tasks that correspond to the instructions 20-29 in the instruction list 20 of FIG. 2A, given the definitions in FIGS. 2D-2F. Thereby, FIG. 2C is a graphical representation of the control process that is executed by the processor 4 based on the control program 5A. Stated otherwise, FIG. 2C graphically represents the recipe for producing the liquid product P as implemented by the PLC 3 when executing the control program 5A. It may be noted that FIG. 2C uses different graphical elements to represent the RUN instructions, the START instructions and the CHECK instructions, and that these graphical elements match the graphical elements in FIGS. 2D-2F.

Initially, as indicated in FIG. 2C, the control process performs an initiation task (cf. 200 in FIG. 2B) based on instruction 21. Then, food processing step A is started and performed until completion, by RUN instruction 22. Thereafter, the control process starts food processing step B, by START instruction 23, and food processing step C, by START instruction 24. Thus, as seen in FIG. 2C, the provision of the START command makes it possible for the processor 4 to control the food processing arrangement 2 to perform the food processing steps B, C in parallel, despite the sequential execution of the instruction list 20 by the processor 4. After START instruction 24, food processing step D is started and performed until completion, by RUN instruction 25, whereupon food processing step E is started and performed until completion, by RUN instruction 26. Then, by CHECK instruction 27, the control process checks if food processing step B, which was started by START instruction 23, has been completed and, if necessary waits until food processing step B is completed. Thereafter, the control process similarly checks, by CHECK instruction 28, if food processing step C, which was started by START instruction 24, has been completed and, if necessary waits until food processing step C is completed. Finally, the control process performs a conclusion task (cf. 203 in FIG. 2B) based on instruction 29.

As understood from FIG. 2C, the provision of the CHECK command enables a programmer of the PLC 3 to ensure that a food processing step, which is started in open-ended fashion by a START instruction, is terminated in a controlled manner. Although not shown in FIGS. 2A and 2C, a food processing step that is started in an open-ended fashion by a START instruction may alternatively be terminated by an END command, which provides the programmer of the PLC 3 with a more direct way of terminating the food processing step, by forcing its termination.

Below follows an example of how the control program 5A may include the RUN instruction 210, the START instruction 220, the CHECK instruction 230 and the END instruction 240, as defined in FIGS. 2D-2G, to bring the PLC 3 in FIG. 1 to implement a control process for production of cocoa milk.

Figure 3:
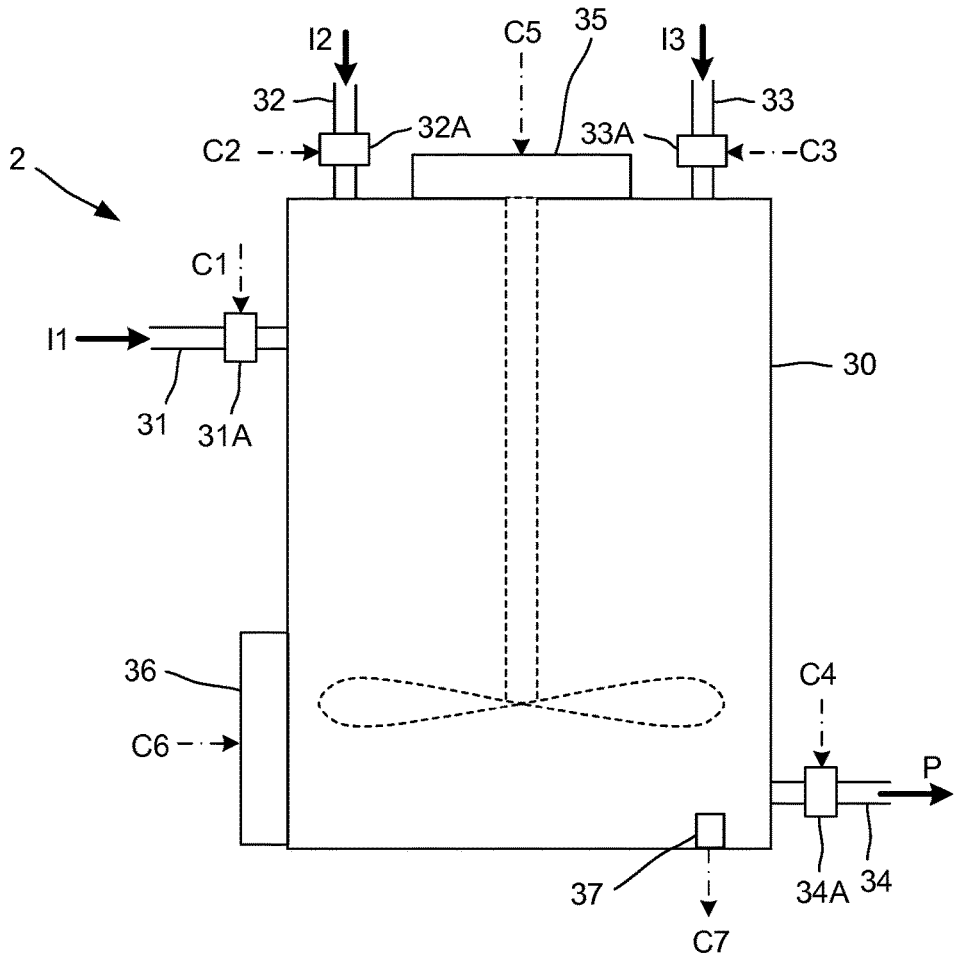
FIG. 3 is side view of an example of a food processing arrangement in the system of FIG. 1.

FIG. 3 is a side view of a food processing arrangement 2 which is operable for batch production of cocoa milk P (also known as "drinking chocolate") based on the ingredients milk 11, cocoa powder 12 and powdered sugar 13. The food processing arrangement 2 comprises a tank 30, which is connected in fluid communication with intake lines (conduits) 31, 32, 33 for the respective ingredient 11, 12, 13 and an outlet line (conduit) 34 for the liquid cocoa milk P. Each line 31, 32, 33, 34 has an on/off valve 31A, 32A, 33A, 34A for controlling the flow through the respective conduit 31, 32, 33, 34. The PLC 3 (FIG. 1) is connected to provide a control signal C1, C2, C3, C4 for selectively opening and closing the respective valve 31A, 32A, 33A, 34A. A mixing device (mixer) 35 is arranged to extend into the tank 30 and is operable to stir the contents within the tank 30. The tank 30 is provided with a heating device (heater) 36 which is operable to heat the contents of the tank 30. A temperature sensor 37 is mounted in the tank 30 to measure the temperature of the contents in the tank 30. The PLC 3 (FIG. 1) is connected to provide a respective control signal C5, C6 to the mixing device 35 and the heating device 36, and to acquire an input signal C7 indicative of temperature from the sensor 37.

FIG. 4A shows an instruction list 20 which is part of the control program 5A that is executed by the PLC 3 to operate the food processing arrangement 2 in FIG. 3 to produce the cocoa milk P by admitting milk 11 into the tank 30, heating and stirring the milk 11 in the tank 30, adding cocoa powder 12 and powdered sugar 13 to the heated milk, and cooling the resulting mixture. The instruction list 20 comprises instructions 401-417 which, when executed by the processor 4, cause the processor 4 to perform a control process that implements a recipe for producing the cocoa milk P from the ingredients 11, 12, 13.

FIG. 4B corresponds to FIG. 2C and graphically represents the control process that results from the instruction list 20 in FIG. 4A. As seen, the control process involves a number of food processing steps that are performed in parallel, which is achieved by the use of START instructions. It may also be noted that a symbol x is inserted into FIG. 4B to indicate a time of completion of the respective food processing step in FIG. 4B.

The control process starts by the PLC 3 performing, based on instructions 401-403, initiation tasks for the tank 30 (also including heater 35, temperature sensor 36 and outlet valve 34A), the intake line 31 (including valve 31A) and the mixer 36 (also including valves 32A, 33A). START instruction 404 then brings the PLC 3 to start a processing step of admitting a predefined quantity of milk 11 into the tank 30, by providing signal C1 to open valve 31A. Thereafter, START instruction 405 brings the PLC 3 to a start a processing step of heating the contents of the tank 30 to a target temperature, by providing signal C6 to activate heater 36. START instruction 406 then brings the PLC 3 to start a processing step of mixing the contents in the tank 30, by providing signal C5 to activate mixer 35. Next, RUN instruction 407 brings the PLC 3 to open valve 32A, by signal C2, to admit cocoa powder 12 into the tank 30. At a time point (indicated by x below box 407) when a predefined amount of cocoa powder has been admitted into the tank 30, the PLC 3 proceeds to RUN instruction 408, which brings the PLC 3 to open valve 33A, by signal C3, to admit sugar 13 into the tank 30. At a time point (indicated by x below box 408) when a predefined amount of sugar has been admitted into the tank 30, the PLC 3 proceeds to CHECK instruction 409, which brings the PLC 3 to check if the predefined quantity of milk 11 has been admitted into the tank 30. In this example, this processing step has been completed, at the time point indicated by x below box 404, and the PLC 3 therefore proceeds to CHECK instruction 410, which brings the PLC 3 to check if the tank 30 has been heated to the target temperature, as given by signal C7. In this example, the tank has not yet reached the target temperate, and the PLC 3 therefore waits until signal C7 indicates the target temperature, which occurs at the time point indicated by x below box 410. Then, the PLC 3 proceeds to RUN instruction 411, which brings the PLC 3 to control the heater 30, by signal C6 and based on signal C7, to maintain the target temperature for 30 minutes. When this processing step is completed, at the time point indicated by x below box 411, the PLC 3 proceeds to RUN instruction 412, which brings the PLC 3 to disable the heater 35, by control signal C6, and let the tank 30 and its content cool to a predefined temperature, as given by signal C7. This may include activating a cooling arrangement (not shown) that is arranged to cool the tank and its content to the predefined temperature. When this processing step is completed, at the time point indicated by x below box 412, the PLC proceeds to END instruction 413, which brings the PLC 3 to disable the mixer 35, by control signal C5, and thereby terminate the processing step that was started by START instruction 406. When the mixer 35 is disabled, at the time point indicated by x below box 413, the PLC 3 proceeds to RUN instruction 414, which brings the PLC 3 to perform a processing step of verifying the quality of the resulting mixture in the tank 30. In such a processing step, the PLC 3 may command the operator, via the MMI 8, to manually take a sample of the mixture in the tank 30 and confirm, via the MMI 8, that the quality is adequate. When the PLC 3 receives the confirmation from the operator, at the time point indicated by x below box 414, the PLC 3 proceeds to performs conclusion tasks based on instructions 415-417. Although not shown in FIGS. 4A-4B, it is understood that RUN instruction 414 may be followed by a RUN instruction that brings the PLC 3 to open valve 34A, by signal C4, to provide the cocoa milk P to a downstream process.

The above described food processing arrangement 2 is only one example of an arrangement for production of liquid food. The arrangement may include any number of processing equipment, arranged in series and/or in parallel, as required for producing the liquid food in question.

From the description above follows that, although various embodiments of the invention have been described and shown, the invention is not restricted thereto, but may also be embodied in other ways within the scope of the subject-matter defined in the following claims.

The invention claimed is:

1. A system for production of liquid food, comprising:
   a food processing arrangement operable to perform a plurality of food processing steps for one or more ingredients to be processed into the liquid food, and
   a computer device which is connected to the food processing arrangement and configured to control the food processing arrangement to perform the plurality of food processing steps,
   the computer device comprising:
      a memory configured to store a control program that comprises a list of instructions configured to cause the food processing arrangement to perform the plurality of food processing steps, wherein the list of instructions comprises command instructions that each allocates a respective food processing step to a predefined control command among a set of predefined control commands, and
      a processor configured to sequentially execute the command instructions in the list of instructions,
   wherein the set of predefined control commands comprises:
      a first start command which is associated, by the processor, with an action of: starting a first food processing step that is allocated to the first start command and proceeding, without waiting for the first food processing step to be completed, to a subsequent instruction in the list of instructions;
      a first stop command which is associated, by the processor, with an action of: ensuring a termination of the first food processing step that is allocated to the first stop command by commanding the first food processing step that is allocated to the first stop command to terminate without waiting for completion of the first food processing step that is allocated to the first stop command, waiting for a confirmation that the first food processing step has been terminated, and proceeding, responsive to the confirmation, to the subsequent instruction in the list of instructions; and
      a second stop command different from the first stop command, the second stop command being associated, by the processor, with an action of: waiting for a second food processing step that is allocated to the second stop command to be completed, and proceeding, responsive to determining that the second food processing step has been completed, to the subsequent instruction in the list of instructions, wherein the first stop command is configured to cause the first food processing step to terminate without consideration of status of the first food processing step and the second stop command is configured to cause the second food processing step to verify completion of the second food processing step, and
   wherein the second stop command is executed after the first start command and prior to the first stop command.

2. The system of claim 1, wherein the set of predefined control commands further comprises a second start command which is associated, by the processor, with an action of: starting a food processing step that is allocated to the second start command, waiting for the food processing step to be completed, and proceeding, when the food processing step is completed, to the subsequent instruction in the list of instructions.

3. The system of claim 1, wherein the food processing arrangement comprises a set of processing devices, the computer device further comprising a signal interface configured to communicate with the set of processing devices, and the processor being configured to, for at least a subset of the command instructions, communicate with one or more processing devices in the set of processing devices.

4. The system of claim 3, wherein the set of processing devices comprises one or more of a valve, a mixing device, a heating device, a cooling device, a temperature sensor, a fluid flow sensor, and a pressure sensor.

5. The system of claim 1, wherein the processor is configured to perform single-threaded processing of the list of instructions.

6. The system of claim 1, wherein the computer device is a Programmable Logic Controller (PLC).

7. The system of claim 1, wherein determining that the second food processing step has been completed is based on at least one of: a signal from a sensor, an input from an operator, or expiration of threshold a time period from a start of the second food processing step that is allocated to the second stop command.

8. A method of producing liquid food according to a predefined recipe which defines food processing steps of a food processing arrangement for producing the liquid food from one or more ingredients, the method being performed by a computer device that executes a control program and controls the food processing arrangement in accordance with the predefined recipe, said method comprising, repeatedly:

reading a current instruction from a list of instructions in the control program, and executing the current instruction before proceeding to execute a subsequent instruction in the list of instructions, wherein the list of instructions comprises:

a first start command that causes the computer device to control the food processing arrangement to start a first food processing step and to proceed, without waiting for the first food processing step to be completed, to execute the subsequent instruction in the list of instructions;

a first stop command that causes the computer device to control the food processing arrangement to terminate the first food processing step by commanding the first food processing step to terminate without waiting for completion of the first food processing step, waiting for a confirmation that the first food processing step has been terminated, and proceeding, responsive to the confirmation, to the subsequent instruction in the list of instructions; and a second stop command different from the first stop command, the second stop command causing the computer device to wait for a second food processing step that is allocated to the second stop command to be completed, and proceed, responsive to determining that the second food processing step has been completed, to the subsequent instruction in the list of instructions, wherein the first stop command is configured to cause the first food processing step to terminate without consideration of status of the first food processing step and the second stop command is configured to cause the second food processing step to verify completion of the second food processing step, and wherein the list of instructions is configured such that the second stop command is executed after the first start command and prior to the first stop command.

9. The method of claim 8, wherein the list of instructions further comprises a second start command that causes the computer device to start a second food processing step, wait for the second food processing step to be completed, and proceed, when the second food processing step is completed, to the subsequent instruction in the list of instructions.

10. The method of claim 8, wherein the computer device executes single threaded processing of the list of instructions.

11. The method of claim 8, wherein determining that the second food processing step has been completed is based on at least one of: a signal from a sensor, an input from an operator, or expiration of threshold a time period from a start of the second food processing step.

* * * * *